Aug. 26, 1924.
I. FLORMAN
1,506,521
MOUNTING FOR AUTOMOBILE ORNAMENTS
Original Filed March 12, 1923
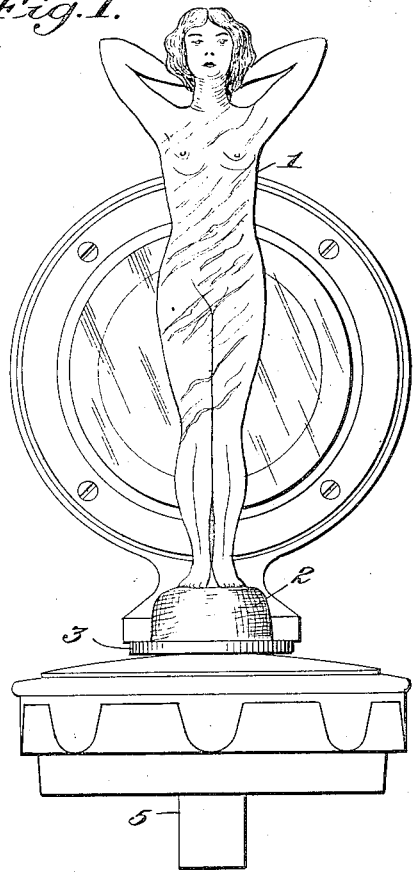
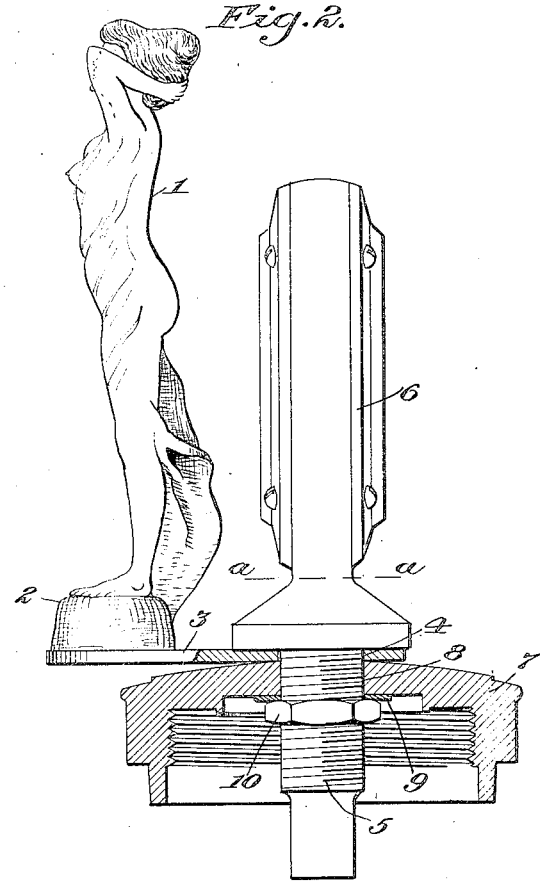
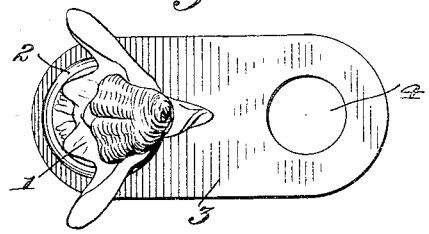
Inventor:
Irving Florman,
Hastings W. Baker
Att'y.

Patented Aug. 26, 1924.

1,506,521

UNITED STATES PATENT OFFICE.

IRVING FLORMAN, OF NEW YORK, N. Y.

MOUNTING FOR AUTOMOBILE ORNAMENTS.

Original application filed March 12, 1923, Serial No. 624,675. Divided and this application filed February 9, 1924. Serial No. 691,856.

*To all whom it may concern:*

Be it known that I, IRVING FLORMAN, a citizen of the United States, residing at New York city, in the county of New York and State of New York, have invented certain new and useful Improvements in Mountings for Automobile Ornaments, of which the following is a specification.

The object of this invention is to so mount an ornament or mascot upon an automobile, particularly over the radiator cap thereof so that the constant jarring and vibration of the automobile will not break or crack it. This is accomplished by securing the ornament to a shock-absorber which is in turn secured to the automobile proper. It will be readily understood, that by providing such a shock absorber for the ornament, the vibration, jarring and bumping of the automobile will be absorbed by the shock absorber and not by the ornament. For the purpose of illustrating the invention it has been shown, in the annexed drawing, in connection with a device for indicating the temperature within the cooling system of an automobile, inasmuch as such ornaments may be used in such connection, although it is evident that the device may be used independently of the temperature indicator.

In the drawing:

Figure 1 shows a front view of this invention;

Fig. 2 shows a cross section through the radiator cap of an automobile and a side view of the shock absorber secured thereto; and Fig. 3 shows a top view of the mascot secured to the shock absorber.

The drawings represent substantially the actual size and proportions preferred in making the subject matter of this invention.

In the drawings 1 represents an automobile ornament which may be any desired figure and is usually made of white metal or bronze. The figure 1 is cast with the base 2 which is soldered or otherwise permanently secured to the forward end of the shock absorber 3. The shock absorber 3 consists of a piece of spring metal preferably steel or brass having an aperture 4 therein, through which the stem 5, of a temperature indicator 6 is passed. The radiator cap 7 of the automobile also has a corresponding aperture 8 therein, through which the stem 5 is also passed thereby positioning the shock absorber 3, between the base of the indicator and the outer top surface of the radiator cap 7. The ornament is then positioned so that it stands forwardly of the temperature indicator and is secured in that position by means of the washer 9 and the nut 10 which is tightened at the inner under surface of the top of the radiator cap 7. The radiator cap 7 may then be secured in its usual position over the filling spout of an automobile radiator. It will be noted from examination of Figs. 1 and 2 that the ornament 1 and the forward end of the shock absorber 3 over the radiator cap 7 stand freely, and as the automobile travels the shock, jarring and vibration caused thereby will be absorbed by the shock absorber 3, relieving the ornament entirely from shock and strain and insuring it against breaking.

The device may be secured to the radiator cap even though a temperature indicator 6 is not used and this may be done by a bolt of a shape and structure like that shown as forming part of the temperature indicator below the line *a—a* in Fig. 2.

This is a divisional application of my co-pending case bearing Serial No. 624,675, filed March 12, 1923.

While I have shown the preferred form of my invention, various modifications might be made therein without departing from the spirit thereof, and I, therefore, do not limit myself to the exact form shown except as I might limit myself in the annexed claims.

I claim:

1. A mounting for an automobile ornament comprising a shock absorber made of a plate of resilient material, means whereby the ornament may be rigidly secured to said shock absorber, and means whereby said shock absorber may be secured between the radiator cap and a temperature indicating device of an automobile.

2. A mounting for an automobile ornament comprising a flat resilient plate, an automobile ornament permanently secured to one end of the plate, said plate having an aperture through the other end thereof, and means adapted to be passed through an aperture in the radiator cap and through the aperture in the plate to secure the said plate and cap together.

3. A mounting for an automobile ornament comprising a plate of spring metal, an ornament integrally mounted at the forward end thereof, said plate having an aperture in the opposite end thereof, said plate being adapted to be inserted between a temperature indicating device and the radiator cap, a shank forming a part of the said device, said shank being adapted to pass through the aperture in said plate and an aperture in the cap to secure the plate between the temperature indicating device and the radiator cap.

4. A mounting for an automobile ornament comprising a flat plate of spring metal, an ornament permanently mounted at the forward end thereof, said plate having an aperture in the top thereof, and means whereby said plate is held between said temperature indicating device and the radiator cap so that the said ornament will be directly in front of the temperature indicating device.

5. In combination, a temperature indicating device for an automobile, a threaded shank forming a part of said device, an ornament mounting, said shank being adapted to pass through an aperture in said mounting and through the cap of the automobile radiator and a nut adapted to be screwed on said shank below the cap whereby the ornament mounting is securely held between the temperature indicating device and the radiator cap.

In testimony whereof I affix my signature.

IRVING FLORMAN.